No. 695,705. Patented Mar. 18, 1902.
E. W. BATCHELOR.
INSULATED JOINT FOR ELECTRICAL CONDUCTORS.
(Application filed Oct. 26, 1901.)

(No Model.)

WITNESSES:
C. E. Ashley
A. M. Donlevy

INVENTOR:
Edward W. Batchelor,
By his Attorney

THE NORRIS PETERS CO., PHOTO-LITHO., WASHINGTON, D. C.

UNITED STATES PATENT OFFICE.

EDWARD W. BATCHELOR, OF HAMMONTON, NEW JERSEY.

INSULATED JOINT FOR ELECTRICAL CONDUCTORS.

SPECIFICATION forming part of Letters Patent No. 695,705, dated March 18, 1902.

Application filed October 26, 1901. Serial No. 80,052. (No model.)

*To all whom it may concern:*

Be it known that I, EDWARD W. BATCHELOR, a citizen of the United States, residing in Hammonton, Atlantic county, New Jersey, have made certain new and useful Improvements in Insulated Joints for Electrical Conductors, of which the following is a specification.

My invention relates to joints or junctions in electrical conductors such as occur where two wire-terminals are twisted around each other and covered with insulating material.

The object of my invention is to perfect and render more durable this spliced junction, which is usually twisted and soldered.

Heretofore wires have been spliced by twisting the end of one around the other, cleaning the surface with an acid, applying a soft solder, and wrapping the soldered junction with an adhesive insulating-tape. The chemical constituents of the tape often attack a junction of this description, and the acid used in soldering attacks the tape, so that the joint deteriorates by reason of the direct contact described.

By my improvement I guard against injury to the junction and to the tape by carefully wrapping the joint with a strip of metal foil. Over the foil I place adhesive tape, as usual; but the chemical action between the soldered junction and the tape is prevented by the presence of the foil.

The accompanying drawings illustrate my invention.

Figure 1:
Figure 2:
Figure 3:

Figure 1 shows the old and well-known form of spliced joint in a bare conductor. Fig. 2 shows my improvement applied to the joints represented in Fig. 1. Fig. 3 shows the helically-disposed insulating-tape wrapped upon the conductor outside the foil, as represented in Fig. 2.

$a$ and $b$ are the divided terminals of a bare copper or iron wire. The end of one conductor is twisted around the other, and the junction thus formed is dipped in acid and soft-soldered. Fig. 2 shows a strip of metal foil $c$ helically arranged upon the junction shown in Fig. 1. I prefer to employ tin-foil $c$ in narrow strips and to lap the edges. I press the ends of the foil $c$ down upon the conductor, and, as shown in Fig. 3, I cover the junction by wrapping a strip of adhesive insulating-tape $i$ over the joint, completely inclosing the foil $c$ and retaining it firmly in position. It results from this construction that the conductivity of a twisted joint remains unimpaired for an indefinite period.

What I claim, and desire to secure by Letters Patent, is—

1. An electric conductor having a joint or junction consisting of twisted and soldered terminals with a sheet of metal foil applied directly upon said soldered joint.

2. A conductor having a joint or junction formed of twisted and soldered terminals, a layer of metal foil helically disposed in direct contact with said soldered junction, and a helical layer of insulating-tape applied to the exterior of said foil.

EDWARD W. BATCHELOR.

Witnesses:
JOHN A. ZOELLS,
C. C. ADAMS.